Sept. 27, 1949.  J. J. SANDERS  2,482,802
HEADSTOCK FIXTURE FOR GRINDING CUTTING TOOLS
Filed April 18, 1946  2 Sheets-Sheet 1

Inventor
JOSEPH J. SANDERS.
By J. H. Church & H. E. Thibodeau
Attorneys

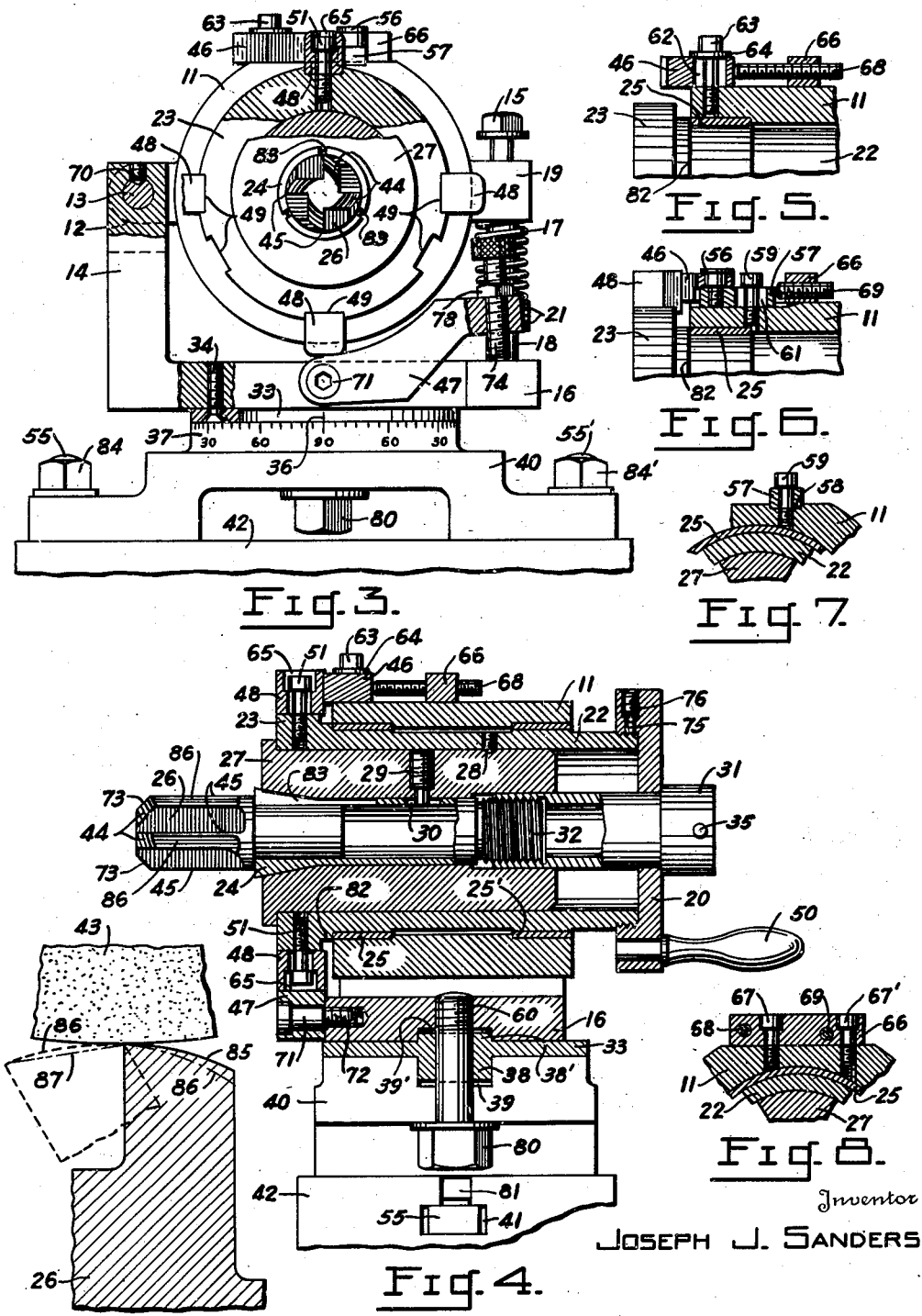

Patented Sept. 27, 1949

2,482,802

UNITED STATES PATENT OFFICE 2,482,802

HEADSTOCK FIXTURE FOR GRINDING CUTTING TOOLS

Joseph J. Sanders, Philadelphia, Pa.

Application April 18, 1946, Serial No. 662,993

2 Claims. (Cl. 51—225)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to the grinding of cutting edges on the teeth of drills, reamers, and the like, and it has special relation to the headstock portions of grinding machines that can accomplish "relief" or "back-off" grinding which provides the proper clearance behind tool cutting edges.

One object of my invention is to provide means for automatically obtaining a contoured or quasi-radial back-off for tool cutting edges which has greater strength and resistance to shearing forces than is provided by prior art straight or radial types of back-off.

Another object is to provide novel and superior means for automatically obtaining uniform back-off grinding behind tool cutting edges which are required to be of precisely equal dimensions.

A further object is to provide a fixture by means of which it is possible to automatically attain such back-off clearances which have greater strength due to greater thicknesses or depth of metal remaining behind the tool cutting edges than heretofore.

A still further object is to reduce the degree of skill required for back-off grinding of end and lateral tool cutting edges.

An additional object is to diminish the amount of time necessary for this grinding operation.

In practicing my invention I attain the foregoing and other objects by providing a headstock fixture of unique construction and superior performance. This fixture employs a conventional swivel type mounting for horizontal positioning with respect to the grinding wheel. Supported by this mounting in horizontal position is a tubular body within which is fitted a hollow spindle. A conventional collet, suitable for holding a cutting tool, is fitted within this spindle with the aid of an adapter, and this concentric assembly is manually (or otherwise) rotatable on an axis perpendicular to that about which the headstock swivels.

With my new fixture, conventional planar surface back-offs can be effected and it will, if desired, permit accomplishment of contoured or quasi-radial clearances of conventional design or of a novel design which give certain advantages to tool cutting edges, as will later be explained. To accomplish the latter, a set of cams and cam followers are employed to simultaneously move the spindle-collet-tool assembly both longitudinally and vertically while it is being rotated. The tool to be ground may thus be made to move in three dimensional directions at one time. The result of moving a tool in such manner into contact with a grinding wheel is an extremely strong radial back-off having an exceptionally large amount of metal supporting the back of the tool cutting edge.

Another superior feature of my device is that by simply adjusting certain settings it is possible to grind the cutting edges of stepped surfaces and contour clearances therefor, without having to remove the tool from the fixture. With my improvement, the aforementioned cam controlled operation enables multi-fluted, step cutting tools to be automatically ground, each cutting surface and back-off therefor being formed to precise dimensions as the tool is caused to move in cycles toward and away from a grinding wheel.

One preferred form of my improved fixture is shown by the accompanying drawings wherein:

Fig. 3 is a frontal view projected backward along line 3—3 of Fig. 2 showing in elevation the headstock's index plate and calibrated dial below the base portion;

Fig. 4 is a longitudinally sectioned showing of my novel device taken from lines 4—4 of Fig. 1;

Fig. 5 is a longitudinal section taken along line 5—5 of Fig. 1 to show the construction of certain cam positioning devices;

Fig. 6 is a similar longitudinal section from line 6—6 of Fig. 1 which shows other cam positioning means;

Fig. 7 is a cross-sectional view taken from line 7—7 of Fig. 2 showing further cam positioning and supporting constructions;

Fig. 8 is another cross-sectional view taken from line 8—8 of Fig. 2 to show still further cam positioning and supporting constructions;

Fig. 9 is an enlarged sectional view of a single cutting tooth and adjacent grinding wheel illustrating the manner in which a contoured back-off for that tooth's lateral cutting edge is ground by means of my novel apparatus, and also furnishing reference means for comparing the product which may be made by the prior art devices with those made by my unique mechanism.

Figures 1, 2:
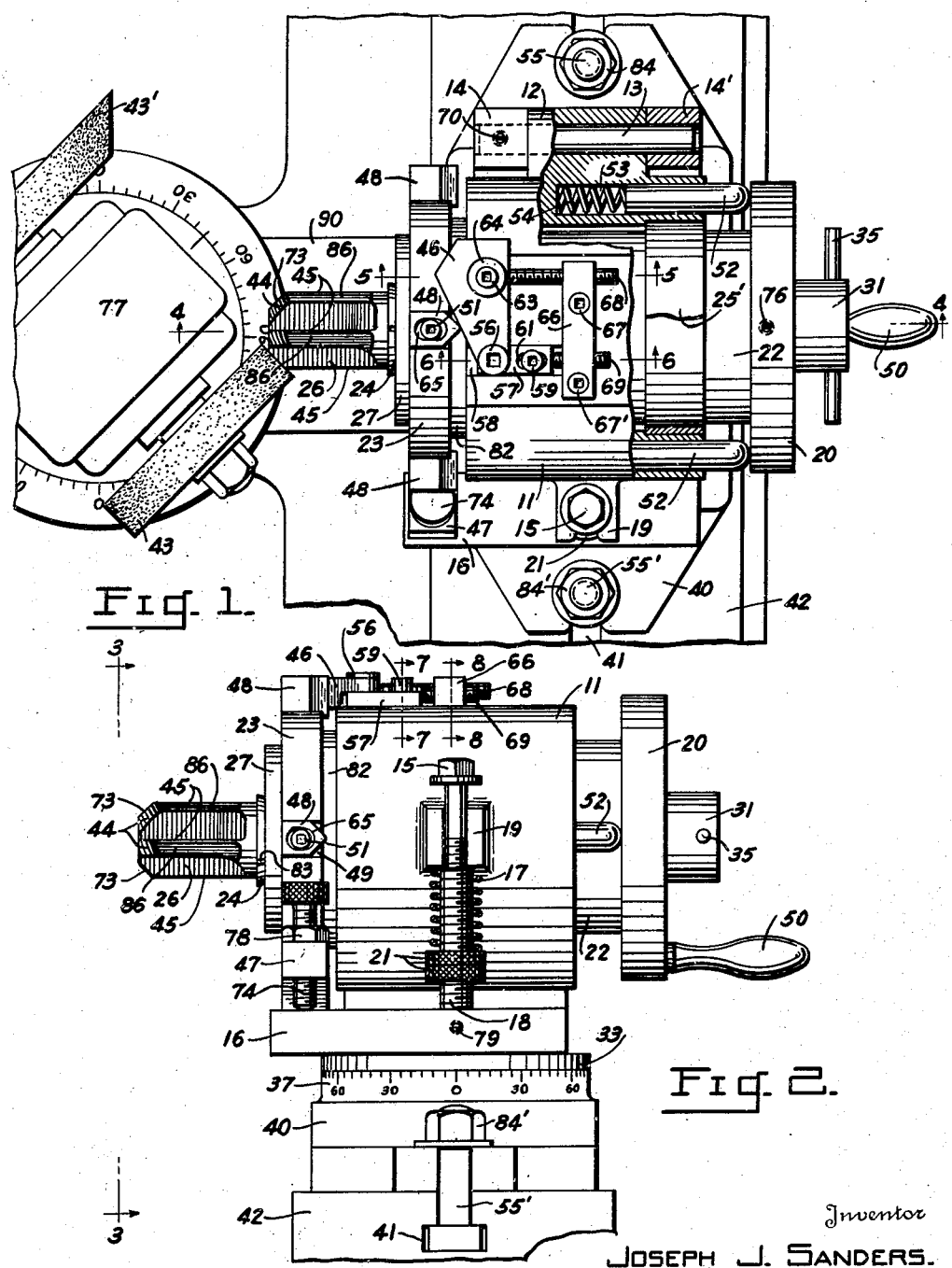
Fig. 1 is a top plan view of an illustrative grinding machine which shows my improved headstock mounted upon that machine's work table where it holds a conventional reamer in the proper position with respect to a motor-driven, cylindrically shaped abrasive grinding wheel to grind a contoured back-off behind each of the four teeth's leading or end cutting edges.
Fig. 2 is a side elevation view of the Fig. 1 headstock and reamer, the motor-driven grinding wheel having been omitted from this representation.

*Contoured back-off grinding with my improved headstock*

Tool grinding machines of the type here considered conventionally comprise as principal components: (a) an adjustably movable work table, usually equipped with a T-slot or dovetail construction for mounting various devices thereon; (b) a movable tool-holding fixture or headstock rigidly mounted on the table; and (c) an adjacent vertically rotatable abrasive grinding wheel, driven by a motor which is capable of being horizontally swivelled a measurable angular distance. My improvements herein shown and described are concerned with headstocks such as above named and with a special application thereof.

My novel headstock is usable in the manner of prior art devices to accomplish the precision grinding of tool cutting edges. In addition, however, one major unique advantage of my device over prior art types is its earlier mentioned ability to automatically achieve a superior type of contoured "relief," or as it will hereinafter be termed "back-off" clearance behind those cutting edges.

The purpose of effecting a contoured back-off instead of the customary planar surface clearance will become apparent as the description proceeds, but one especially important advantage will be described here.

It is well known that a certain "wedge" of metal (such as is included between lines 85—86 of Fig. 9) must be removed from behind the tool's cutting edge to make that edge sufficiently knife-like to cut into material being worked on. The clearance left by removing this "wedge" also enables the material being cut to be removed as the tool penetrates therein deeper and deeper. The region supporting the cutting edge of the conventional straight surfaced or planar back-off (typified by line 87 in Fig. 9) is thus made fairly narrow, and large forces are concentrated upon a narrow volume of metal. By having a contoured or arched back-off (typified by 86 for lateral cutting edges 45 as shown in Fig. 9, and by 44 for end cutting edges 73 in Figs. 1 to 4) these forces are distributed over a more substantial supporting structure (i. e. the extra metal such as is included between lines 86—87 of Fig. 9) without diminishing the tool's cutting ability. Comparison of the planar and contour back-offs will make self-evident the reasons why the latter design tends to greatly increase the cutting life of the tool, a fact which has been repeatedly substantiated by actual tests.

With some prior art headstocks, in order to achieve this contoured back-off, the tool must be maneuverably "fed" in an arc to the grinding wheel. The grinding wheel is vertically rotated from a fixed position; the tool is held perpendicularly thereto while being swivelled horizontally before the wheel about a fixed axis. To so arc the tool before the grinding wheel, the operator must vary the radial distance between that fixed axis and the edge of the grinding wheel. This can be done by shifting the tool into position to engage the grinding wheel at the beginning of a cut, gradually retracting the tool from the wheel as the crest of the desired contour is obtained, then reengaging more and more of the tool against the wheel to complete the contour of the desired arched back-off.

Obviously, to manually reproduce such intricate manipulations for a series of tool cutting edges would call for undesirably rigorous requirements of skill and dexterity. I have now provided novel means for automatically reproducing the just described movement of the tool which have substantially eliminated these high skill requirements and have made grinding of an arched back-off behind tool cutting edges a relatively simple expedient. Moreover, my novel device makes possible the achievement of a radial back-off that is superior (for reasons earlier explained) to that achieved by any prior art automatic or non-automatic device.

Reference to the drawings will show that, essentially, my improvements utilize a rotatable holder (a concentric unit comprising a spindle 22, collet 24 and adapter 27) for the tool 26 which is to be ground; cam followers 48 on one part of the holder; and a pair of cams 46—47 which cause the tool to be moved necessary distances up or down and back or forth as the holder is rotated. The number of times which these movements occur will depend upon the number of cam followers 48 that are employed, and will in turn be governed by the particular contour desired for a particular cutting edge's back-off.

By proper setting of these cams and cam followers, the tool 26 can thus be made to approach the grinding wheel 43 in an arched path just described by simply rotating the holder assembly 22—24—27. For this purpose, a handle 50 is conveniently supplied. Depending upon whether one or both cams 46—47 are employed the arc thus effected is "bi-directional" or "tri-directional" and is caused, by means later to be described, to make tool 26 simultaneously advance in a gradual manner laterally, forwardly and/or vertically. Continued rotation of tool-holder 22—24—27 causes the tool to cyclically retrace these movements to reach its original starting point. This action can thus be repeated over and over again, gradually bringing the tool closer to the grinding wheel by slidably adjusting the work table 42 (on which my fixture is mounted) upon a cross-slide 90 (see Fig. 1), and each time removing a certain amount of metal until the depth desired for the arched back-off behind the cutting edge is reached.

*Construction of my improved headstock*

The construction of my unique headstock which enables it to be used in the manners just outlined will now be described. For ease of explanation, directional reference hereafter made to my headstock as shown in Figs. 1—2—3—4 will be as follows: The front end is that from which protrude cutting edges 44 and 45 of tool 26; the rear end is that which has the holder rotating handle 50; clockwise and counterclockwise directions of rotation will be given as they appear when viewed from front to rear.

The improved headstock will be seen from Figs. 1-3 to include a hollow cylindrical body portion 11 conveniently suspended on one side by a hinge 12 connected by a pin 13 which extends between two perpendicular supports 14 and 14' that project upward from a base plate 16. The hinge pin 13 is fixed in its proper position by a set screw 70 as shown in Figs. 1-3.

Helping this hinged connection, on the opposite side of the headstock, to support the weight of the body 11 and the various attachments thereof is a compression spring 17 maintained in vertical position by a stud 18 which is threaded into base plate 16, as illustrated in Figs. 2-3, and there fixed against movement by a set screw 79 (see Fig. 2). A bolt 15, having a laterally expanded lip between its head and shank, is screwed into the upper end of stud 18. Around this bolt 15 fits a forked member 19, which projects from body 11 to rest on spring 17, and is there held in the position illustrated by Figs. 1—2—3 so as to permit vertical movement limited above by the head of the bolt and below by the spring 17. The desired distance of this vertical movement is controllable by means of two lock collars 21 which are threadably connected around stud 18 (see Fig. 2) to make possible the maintenance of spring 17 in a higher or lower position as may be necessary.

Concentrically positioned in close-fitting relationship with the interior walls of the hollow cylindrical body 11 is a sleeve-like spindle 22 (see Figs. 1—2—4). Two bushings 25 and 25', of a desired bearing type material such as bronze, encircle spindle 22 as indicated in Fig. 4. These bushings serve to prevent wear on the spindle's outer or body 11's inner wall surfaces, while also maintaining uniform clearances between the two.

This spindle 22 is capable of being rotated about an axis parallel to the work table 42 as well as limited longitudinal (forward and backward) sliding movement within and a small distance beyond either end of the hollow body 11. The forwardmost part of spindle 22 has a flanged portion 23. Immediately to the rear to this flanged portion 23, the spindle has a shoulder 82 which limits the amount of the spindle's rearward movement upon coming into contact with the forward face of bushing 25 (see Fig. 4).

A separable collar 20 is threadably attached as shown in Fig. 4 to the rear end of the spindle, thereby limiting the distance of its possible forward movement. To prevent this collar 20 from working loose, a soft brass plug 75 is dropped through a hole therein (see Fig. 4) to contact the threaded connection of the collar 20 and spindle 22. A set screw 76 is then tightened in place behind the plug 75 which is thereby wedged against the spindle to lock collar 20 thereto. The previously described bushings 25—25' help to minimize wobbling of the spindle during the course of the described forward and backward motions.

*Tool holding collet and adapter*

Practically any conventional collet 24 or chuck (not shown) may be used for holding the tool 26 in rigid relationship with respect to the spindle 22. An adapter 27 which makes this optional choice of collet sizes possible is immovably maintained in concentric, snug fitting engagement with the interior walls of spindle 22 by a set screw 28 in the manner shown by Fig. 4. This drawing view also illustrates the manner in which collet 24 is maintained securely positioned within adapter 27 by another set screw 29, which engages a longitudinal slot 30 in the collet to allow lengthwise movement, but prohibits any rotary motion.

A draw bar 31, by threadable connection shown at 32, serves to fasten tool 26 in place within collet 24 in the following manner. By means of a handle 35, the draw bar 31 may conveniently be turned counterclockwise to tighten its hold on and at the same time rearwardly pull collet 24. This is made possible because the draw bar is prevented against forward movement by its rear end which is braced against the spindle's rear collar 20. By such rearward movement of collet 24 the internal diameter of its forward end is gradually diminished to such proportions that the collet securely grips tool 26.

Facilitating this diametrical decrease customarily are longitudinal slits 83 in the entire wall thickness of the collet, extending somewhat beyond the length of the outer wall's tapered portion (see Fig. 4) to give the walls a flexible or spring action. In addition, the entrance to the bore of adapter 27 is, like the front end of the collet, of diminishing taper as Fig. 4 shows. Thus, as the collet penetrates deeper and deeper therein its walls are compressed by the inside walls of the adapter to grip the tool as just described.

*Index plate and mounting for headstock*

The headstock's base portion 16 has an index plate 33 attached to its under side (see Figs. 2—3—4) by two screws 34, one of which is exposed in Fig. 3. This index plate 33 has a reference line 36 (also in Fig. 3) engraved thereon in a direct line with the central longitudinal axis that is common to all the concentric cylindrical parts of the head stock as well as tool 26.

Index plate 33, together with the attached base 16, body 11 and other parts earlier described as being supported thereon, are arranged for pivotable movement about an axis perpendicular to work table 42 upon the mounting 40 which serves to hold the entire headstock to the work table. Examination of Fig. 4 will make clear the construction of the index plate which has two continuous, hollow-bore hubs 38—38' and their relation to base 16 and mounting 40. The lower hub 38 fits into a central recess or opening 39 in the mounting 40, while the upper hub 38' fits into a recess 39' in sustaining base portion 16.

When the hubs 38—38' are thus situated in recesses 39—39', respectively, the hollow bore of those hubs is continuous with a bore of equivalent diameter in base 16 and mounting 40 (shown in Fig. 4 filled by the shank of a stud 80 which is used to fasten the horizontally pivotable headstock in a desired position with respect to the mounting, as will be explained below).

The mounting 40, like the just discussed index plate 33, is of a conventional construction which permits two lower projections 81 (only one of which as shown in end view by Fig. 4) to be keyed with a T-slot 41 (see Figs. 1—2—4) in work table 42. This arrangement permits the entire headstock to be easily moved back and forth on the work table, enabling the tool 26 to be positioned as near to the grinding wheel 43 (see Fig. 1) as required. Once the headstock has been maneuvered into the desired position, it can be fastened firmly to the work table by two bolts 55—55'. The heads of these bolts clamp against the under side of T-slot 41 as shown in Figs. 2—4, the shanks passing through the two forked ends of mounting 40 (see Figs. 1—2). Tightening of nuts 84—84' on the bolts then serves to immovably fix the headstock mounting upon the table.

After the just described placement of mounting 40 has been accomplished, the index plate 33 and other parts supported thereon may be swivelled to the proper position with respect to grinding wheel 43 and, as previously indicated above, stud 80 (see Figs. 3—4) may be tightened in the threadable connection 60 provided in base 16 as shown in Fig. 4. Thus made tight, the broadened lip between the head and shank of stud 80 is clamped against the under surface of mounting 40 to prevent any movement of base 16 from its "set" position.

For convenience, and especially for use in reproducing with precision the placement of the pivotable unit which includes the base 16, index plate 33 and the tool-holding parts, a calibrated dial 37 (see Figs. 2—3) is engraved around the outside of mounting 40 for use in connection with the aforementioned reference line 36 (see Fig. 3) on the outside of the index plate. Dial 37 may be calibrated over 360 degrees in accordance with any conventional practice.

In the illustrated model, the dial is marked off in quarters of 90°, with divisions so designated that there are two diametrically opposed points labelled "0°," and perpendicular to that diameter is a line on each end of which are two opposing reference points labelled "90°" (compare Figs. 2—3). The calibrations are so made that the two 90° points coincide with reference line 36 when the concentric body 11, spindle 22, adapter 27, collet 24 and tool are all positioned with their longitudinal axes perpendicular to the direction taken by T-slot 41 of work table 42 (as shown by Fig. 3).

Cam controlled operation

The automatic operation which accomplishes contoured back-off as well as end, lateral or stepped edge grinding is, as earlier mentioned, principally dependent upon the actions of two cams which may be distinguished as a "longitudinal adjusting cam" 46 and a "vertical adjusting cam" 47 (see Figs. 1 to 6). When these two cams are set to desired adjustment, a series of cam followers 48 guide the movements of tool holding spindle 22 and body 11 as required. In the illustration of Figs. 1—2—3—4 my unique device is set to grind the back-off behind the leading or end cutting edges 73 of tool 26. It should be understood, however, from what has already been stated, that by changing the settings my improved mechanism can just as readily be made to grind the back-off behind the lateral cutting edges 45 as shown at 86 in Fig. 9.

Cam followers 48 are shown in Figs. 1 to 4 and 6 as affixed in four of six available recesses 49 therefor in the spindle's forward flange 23. Holding the cam followers 48 securely in place are bolts 51 (see Figs. 1—2—3—4) which pass through slots 65 in those cam followers and screw into this same forward spindle flange 23. As spindle 22 is turned by the handle 50 in counterclockwise direction, the cam followers 48 are made to push against the stationary cam 46 which has been "set" for a particular operation, thereby forcing spindle 22 to move forward (see Fig. 1). Likewise, and at the same time, pressure of other cam followers upon the fixed cam 47, which also has been "set" previously, causes the spindle as well as the body 11 to move upward (see Fig. 3).

The forward movement of spindle 22 is so regulated with respect to the amount of its rotary movement by the setting of cam 46 that the tool 26, being held by the holder 22—24—27 of which the spindle is a part, is "fed" in a horizontal arc before the grinding wheel 43. Similarly, cam 47 is set so as to effect a vertical cut which can extend in depth the arc shaped clearance or quasi-radial back-off 44 (see Figs. 1 to 4) behind the end cutting edge 73 which the forward cam 46 controlled movement of tool 26 has made possible.

When the spindle 22 is caused to move forward, as described above, its separable rear collar 20 pushes two pins 52 into recesses 53 in the rear end of body 11. This pressure causes compression of springs 54 which are situated in those recesses 53 before the pins 52 (see Fig. 1).

Springs 54 have a continuous tendency to expand and thereby force collar 20 as well as spindle 22 and its non-separable forward flange 23 rearwardly. This action tends to maintain the cam followers 48 which are attached to that forward flange 23 in constant close contact with cam 46. Similar close relationship between these cam followers and cam 47 are maintained due to the pressure caused by heavy weight of the body 11, spindle 22 and other parts suspended between the supporting hinge 12 and the forked member 19 which rests on spring 17.

Cam which controls longitudinal motion

Figs. 1 through 8 show one preferred manner and means of regulating the cam 46 which governs longitudinal motion of the spindle, adapter, collet and tool assembly. By means of screw 56 this cam is attached to an adjusting plate 57. As shown in Fig. 1, this plate 57 rests in a longitudinal recess 58 that permits its movement lengthwise of the body, but prevents the plate from moving laterally. This plate 57 is fastened to body 11 for security against all motion by a screw 59 (see Fig. 6) which passes through a lengthwise slot 61 (Figs. 1–6) in plate 57, and fastens into position in body 11.

The other end of cam 46, not attached to plate 57, is fastened to body 11 in desired position by means of a screw 63 and a washer 64 (Figs. 1, 4, 5). The hole in cam 46 through which this screw 63 passes is considerably larger in diameter than the shank of the screw itself, permitting this end of cam 46 a small amount of lateral "play" pivoting about the fixed axis provided by screw 56, which helps to attain a required adjustment. When properly set, the washer 64 enables screw 63 to clamp the cam firmly and thereby make this connection secure, as indicated above, because the washer's inside diameter is less than that of the head of the screw, but its outside diameter exceeds the hole in plate 57 through which the screw passes.

For regulating cam 46 an adjusting block 66 is mounted on body 11 by two screws 67 and 67' as shown in Figs. 1-8. A long adjusting screw 68 and a shorter one 69 are threaded horizontally through holes tapped in block 66 (see Figs. 1, 2, 4—5—6—8). To set cam 46, screws 59 and 63 are first loosened. Turning adjusting screw 68 sets the position desired for the end of cam 46 which is thereby unattached. As adjusting screw 69 is moved it regulates the positioning of plate 57 and the end of cam 46 which is attached thereto. After reaching the placements desired, screws 59 and 63 are again tightened to assure non-movement of cam 46 throughout the grinding operation.

Cam which controls vertical motion

Figs. 2—3—4 show one means of attaching cam 47, so that it remains adjustable for controlling "vertical" motion of the body, spindle, adapter, collet and tool assembly. This assembly does not move wholly vertically, but tends to pivot about hinge pin 13. Actually, however, such pivoting is not essential, and the apparatus could function just as well if the body 11 were supported for "floating" up-and-down movement such as could be had by replacing the hinged construction with guide-rods (not shown) or a support similar to member 19 resting on spring 17.

As the drawings show, the cam 47 which causes this motion is attached on one end by a stud 71, the lower portion of which is threaded for connection with base 16 as indicated at 72 in Fig. 4. Cam 47 pivots in a vertical direction about the unthreaded portion of stud 71.

The other end of cam 47 has a threaded opening through which a knurl-handled regulating screw 74 extends as shown in Figs. 2—3. By adjusting screw 74, cam 47 may be elevated or lowered as desired, the cam moving up or down the screw which is itself prevented from downward movement by the weight of body 11 and parts contained therein. This screw 74's threaded jointure with the tapped hole in cam 47 (shown exposed in Fig. 3), serves together with a lock nut 78 to prevent cam 47's misadjustment once the cam is set as desired, as the cam cannot be moved without turning the screw.

Setting the cams

The positioning of the two cams 46 and 47 involves a brief "trial and error" procedure. Initially, they are adjusted so that the cam followers 48, on striking the cams, only slightly displace the position of the tool 26 as held in the spindle 22. Gradually, the operator using my device regulates the cams to cause more and more of tool 26's surface to be "fed" to the grinding wheel 43 as desired.

While this preliminary procedure requires a certain degree of skill, once the cams are set to control the amount of back-off clearance 44—86 or cutting edges 45—73 which will be obtained upon rotating the tool 26, a relatively unskilled operator can grind a large number of tools without further adjustment being necessary. In fact, the only manipulations thereafter required are just to assure that a constant distance between the tool and the grinding wheel 43 is properly maintained as the wheel's abrasive substance is progressively worn down. This is done by simple adjustments to cross-slide 90 (by mechanism not here shown) which moves the work table 42 and my improved fixture thereon closer to the grinding wheel.

As earlier indicated, both cams 46—47 may or may not be used concurrently, depending upon the particular grinding job to be done. It will be obvious that by moving either cam out of contact with the cam followers (or removing a cam altogether), the tool can be made to move in but one direction in addition to being simultaneously rotated.

Thus, the tool can be made to move longitudinally forward to meet the grinding wheel, then back and forward again a number of times depending on the number of stepped cutting teeth faces that are to be ground. Similarly, the tool can be made to move in a direction perpendicular to its long axis, i. e., up and down or laterally back and forth, depending on its position with respect to the grinding wheel. Such motion, together with rotation given the tool as the holder assembly 22—24—27 is turned, enables each tooth to be given a contoured back-off.

Still further adaptation of my device is possible. For example, in certain grinding jobs, advantage can be taken of simultaneous vertical, longitudinal and rotational tool movements which will achieve a contoured back-off that encircles the lateral cutting edge of each tooth in the form of a helix, rather than in a simple circumferential path. Such "helical back-off" enables the tool to function better, the cutting edge penetrating more easily, and the chips which form as a material is drilled or reamed are more "cleanly" removed therefrom.

Setting the cam followers

Reference to Fig. 3 will show four cam followers 48 respectively fastened in four of six recesses 49 which are there illustratively shown. For grinding more complex tools, additional recesses 49 can be made in spindle 22's forward flange 23 so as to utilize extra cam followers 48. Thus it is readily possible to conveniently grind drills, reamers, counterbores and the like having two, four, six or other conventional numbers of flutes and cutting edges by using additional cam followers.

The view of Fig. 3 shows the four cam followers 48 arbitrarily set 90° apart at the 12, 3, 6 and 9 o'clock positions. Optionally, on the device shown, the cam followers 48 could be separated from each other by 120° at approximately the 12, 4 and 8 o'clock positions. When required for special work, as where the cutting edges are not equilaterally positioned, the cam followers can be unequally spaced to obtain desired "feed movement" of the tool 26 for grinding by the abrasive wheel 43.

Other adjustments to the thus positioned cam followers are made possible by the slots 65 in each one which permits the followers to be moved longitudinally closer or farther away from cam 46. The ability to make adjustments in this way may often eliminate the need for re-setting cam 46, a somewhat more complicated procedure than regulating the position of the cam followers.

Advantages over prior art devices

From the foregoing description and explanation some of the advantages of my improved headstock fixture over many prior art devices will have become evident. The outstanding point of superiority consists of the ability of my apparatus to automatically grind the superior type of radial back-off clearances earlier described behind both the end and lateral type of tool cutting edges with a single setting of the machine. This is a tremendous improvement over most old type headstocks which had to be dextrously maneuvered by hand to gain an equivalent radial clearance.

Another advantage is that the same cam followers engage the different cams so that only a setting of the cams is necessary to accomplish the required function, thereby simplifying the use of the machine in comparison with prior art devices which employ with their separate cams correspondingly separate cam followers and thus require time-consuming individual settings and "timing" of both their cams and their co-acting cam followers. With the present invention, since the same followers engage the different cams, need for separate adjustments of the followers is eliminated, and moreover, the construction of the device is simplified in that no special followers need be designed and constructed for each of the different types of cams involved.

A further advantage is that each of the tool cutting edges (the lateral edges 45 and end or leading edges 73) is ground much more evenly than heretofore. Under many old systems a single cutting edge is ground a desired amount, then the tool is rotated within the headstock so as to present another edge for grinding. As the grinding wheel 43's abrasive material wears, correspondingly less metal is removed from the tool. The harmful effects which then will result can readily be appreciated by considering what happens to the lateral cutting edges. The radius which extends from the longitudinal axis of the tool to each such edge is left greater than the preceding one from one cutting tooth to the next, the very last to be ground having the greatest radius of all. A drill, reamer or similar tool having cutting edges so unequal in size is inefficient in that only the cutting edge having the largest radius will be operative on the material being cut, thereby increasing the burden thereon and thus correspondingly accelerating that edge's wear and decreasing the tool's life span.

To compensate for this abrasive wheel wear, the operator of those particular types of prior art machines has had to constantly gauge the cutting edges, and adjust the feeding of the tool so that as the wheel wears down, the tool is brought closer to it. This adjustment is rather delicate and requires an extremely high degree of skill to establish the proper positioning of each cutting edge with respect to the progressively diminishing abrasive wheel, as the latter exists when a particular edge is being ground.

With my improved headstock no such fine adjustments are necessary. As grinding wheel 43 wears down, its position is maintained with respect to the tool 26 equidistantly from all the cutting edges 45 and 73. This effect is accomplished by the continual turning of the tool in the aforedescribed manner, instead of the prior art machine's technique of grinding down parts of one cutting edge at a time, then proceeding to the next edge, and so on. With my improved technique, an adjustment which is made to work table 42 to bring the tool 26 closer to grinding wheel 43 will not result in one edge being ground to an appreciably greater or lesser amount than another. Instead, the resultant added depth of cut will be equally maintained in each cutting edge.

Summary

It will be seen that by my improved headstock for grinding machines here shown and described I have provided means for automatically obtaining a contoured or quasi-radial back-off for tool cutting edges which has greater strength and resistance to shearing forces than do the prior art straight or radial types of back-off; that I have provided novel and superior means for automatically obtaining uniform back-off grinding behind tool-cutting edges which are required to be of precisely equal dimensions; that I have provided a fixture by means of which it is possible to attain such back-off clearances which have greater strength due to greater thicknesses or depth of metal remaining behind the tool cutting edges than heretofore; that I have reduced the degree of skill required for back-off grinding of end and lateral and "step" tool cutting edges; and that I have diminished the amount of time necessary for this grinding operation.

My inventive improvements are therefore extensive in their adaptation and are not to be restricted to the specific form here disclosed by way of illustration.

I claim:

1. In a tool grinding fixture, the combination of a base having post members extending perpendicularly therefrom, a cylindrical body horizontally supported by said post members for limited forward and backward movement in a direction perpendicular to said body's longitudinal axis, a concentric spindle rotatably carried within said body and movable longitudinally therein, tool holding means carried by said spindle in axial alignment therewith, a first cam member adjustably mounted on said body together with means for fastening said member in various positions as required, a second cam member pivotally mounted on said base together with means for fastening that member in various required positions, and adjustable cam follower members borne by said spindle upon whose rotation they at one time or another engage first one and then the other of said first and second cams, at least two of said followers simultaneously engaging both said first and second cams and thereby functioning simultaneously to move said tool holding means axially and vertically without interfering with its rotation.

2. In apparatus for automatic grinding of cutting edges and clearances therefor on tools or the like, the combination of a rotatable grinding wheel, a work table adjacent to said grinding wheel and positionally adjustable with respect thereto; a stationary flat circular platform whose sides are calibrated in degrees for reference purposes mounted on said table, a horizontally pivotable base portion attached to said platform, a hollow cylindrical holder body horizontally mounted on said base portion for limited vertical movement, a hollow cylindrical spindle concentrically positioned for rotatable and longitudinal movement within said holder body, an adapter concentrically secured within said spindle, a radially compressible collet within said adapter for holding a cutting tool by engagement with the tool's rear end whereby the front end of the tool partially projects from the collet, means situated immediately behind said collet for radially compressing said collet and fixing said tool in immovable position, cam followers fixed in position on said spindle, a first adjustable cam attached to said body and shaped to cause said cam followers to cyclically move said spindle which contains said tool forwardly a certain distance for each degree of said spindle's rotation, and a second adjustable cam attached to said base portion and shaped to cause said cam followers to cyclically move said body and said spindle which contains said tool upwardly a certain desired distance for each degree of said spindle's rotation, all of said followers at one point or another of their rotation engaging first one and then the other of said first and second cams, at least two of said followers simultaneously engaging both said first and second cams and thereby functioning to move said tool into contact with said grinding wheel along an arcuate path determined by the named forward, upward and rotative movements simultaneously undergone by said tool.

JOSEPH J. SANDERS.

REFERENCES CITED

The following references are of record in the file of this patent:

UNITED STATES PATENTS

| Number | Name | Date |
|---|---|---|
| 1,323,452 | Cogsdill | Dec. 2, 1919 |
| 2,068,915 | Hardin | Jan. 26, 1937 |
| 2,099,724 | Cogsdill | Nov. 23, 1937 |
| 2,342,889 | Polson | Feb. 29, 1944 |
| 2,358,241 | Moody | Sept. 12, 1944 |
| 2,391,317 | Klein | Dec. 18, 1945 |
| 2,413,436 | Dawson | Dec. 31, 1946 |

FOREIGN PATENTS

| Number | Country | Date |
|---|---|---|
| 385,746 | Great Britain | Jan. 5, 1933 |